Aug. 16, 1938.  A. R. WELCH  2,127,278

CHARGING AND DISCHARGING MECHANISM FOR PRESSES

Filed Nov. 26, 1934  3 Sheets-Sheet 1

Inventor
Arthur R. Welch
By Charles L. Reynolds
Attorney

Aug. 16, 1938.　　　A. R. WELCH　　　2,127,278
CHARGING AND DISCHARGING MECHANISM FOR PRESSES
Filed Nov. 26, 1934　　　3 Sheets-Sheet 2
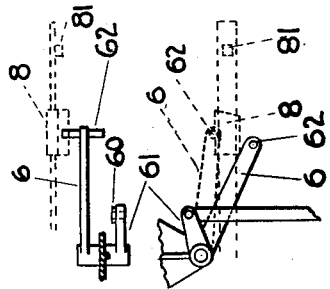
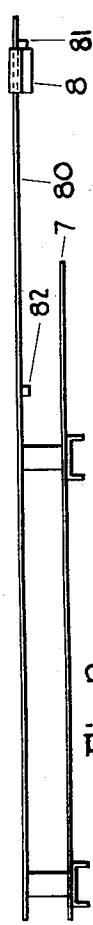
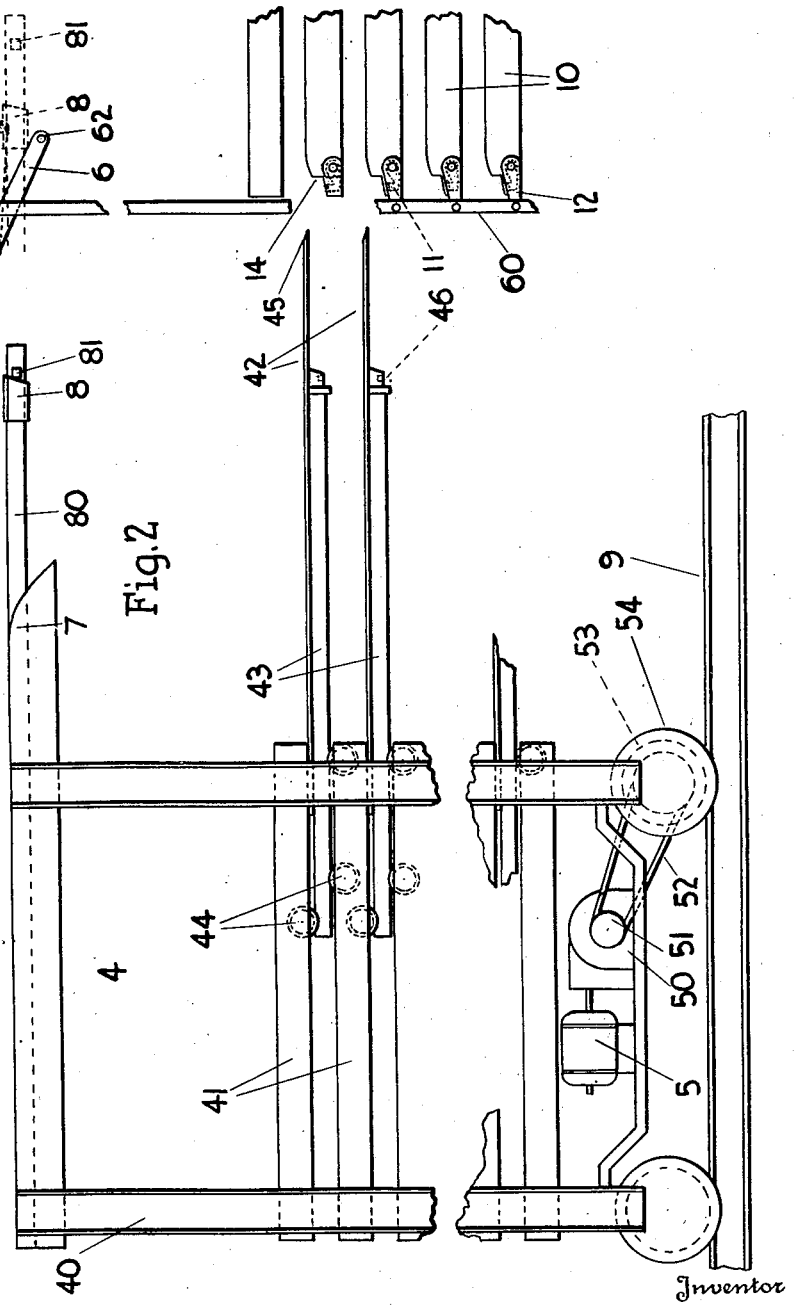
Inventor
Arthur R. Welch
By Charles L. Reynolds
Attorney Aug. 16, 1938.    A. R. WELCH    2,127,278
CHARGING AND DISCHARGING MECHANISM FOR PRESSES
Filed Nov. 26, 1934    3 Sheets-Sheet 3
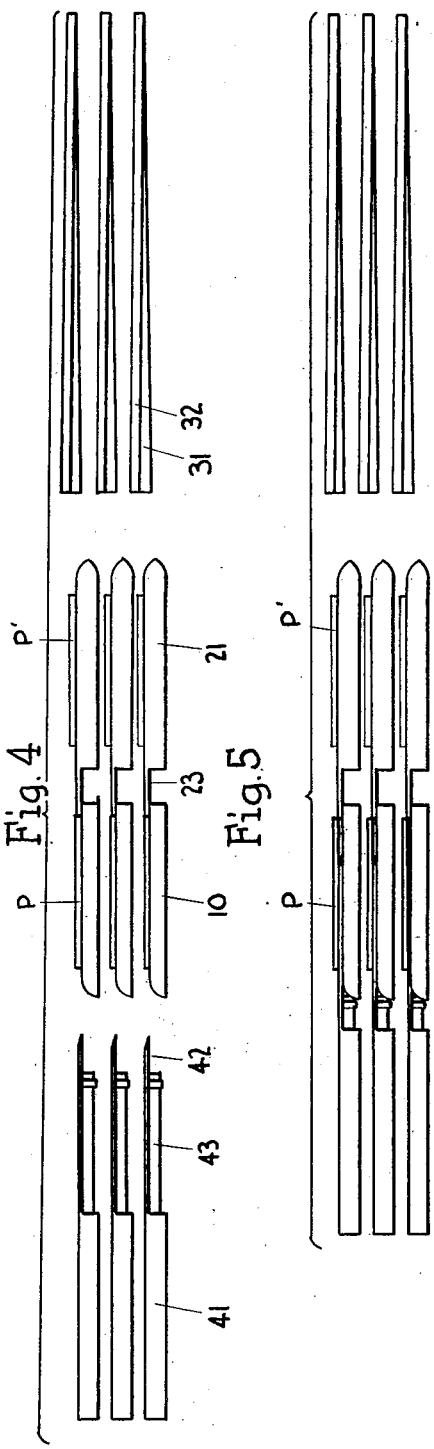
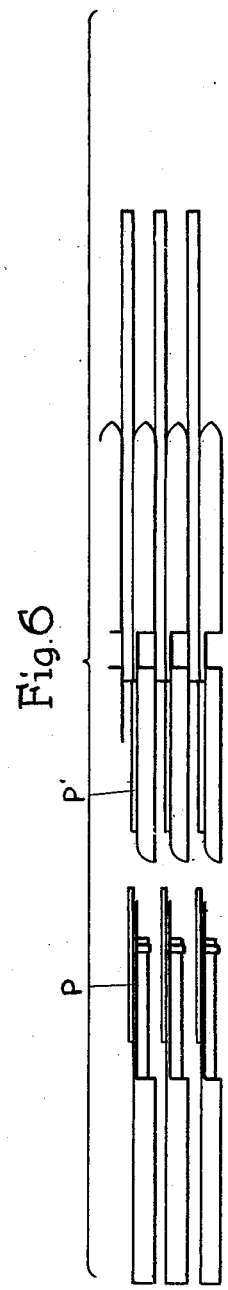
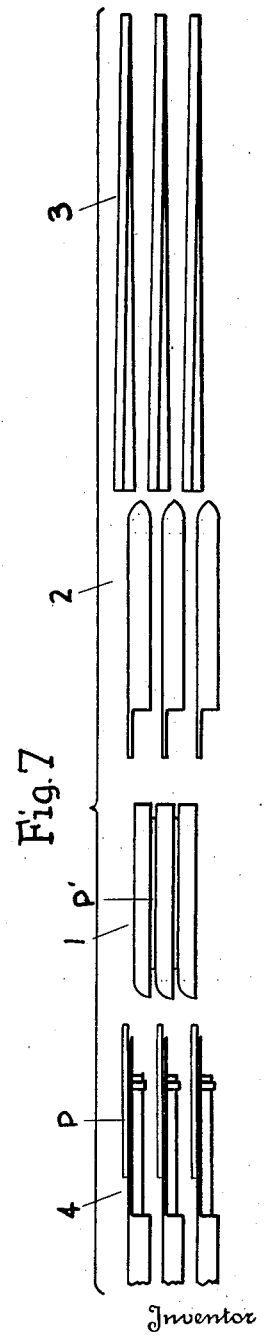
Inventor
Arthur R. Welch
By Charles L. Reynolds
Attorney Patented Aug. 16, 1938

2,127,278

UNITED STATES PATENT OFFICE 2,127,278

CHARGING AND DISCHARGING MECHANISM FOR PRESSES

Arthur R. Welch, Hoquiam, Wash., assignor to Harbor Plywood Corporation, Hoquiam, Wash., a corporation of Delaware Application November 26, 1934, Serial No. 754,825

26 Claims. (Cl. 214—18)

My invention relates to the manufacture of plywood. The mechanism and the method apply more particularly to the manufacture of plywood with the use of an adhesive or binder which sets under application of heat and pressure, for instance, a synthetic resin, but in many respects the principles of the invention may be employed in the manufacture of plywood with other adhesives, for example, the glues now commonly used, as will appear hereafter.

In setting such binders which require the application of heat and pressure through a given time interval, the timing and the degree of heat and pressure must be substantially uniform on all plies in order to make them uniform in all characteristics. Economy in manufacture requires the use of a multiple plate press, involving problems of loading such a press with a considerable number of panels, and the unloading of these panels, in such a way as to insure uniformity in these factors. To avoid imperfections in the finished product, and for other reasons, it is preferable that the panels contact directly with the smooth, firm surfaces of the hot plates themselves, while being pressed. My invention therefore has for its primary object the provision of means for economically, conveniently and expeditiously handling such material into and out of such a press, so that all plies will be subjected to substantially the same amount of heat and pressure through substantially the same time interval, and will be relieved from direct contact with a heated surface promptly upon opening the press.

It is a further object to provide mechanism for the purpose indicated which shall be comparatively inexpensive and rugged, and which will occupy a minimum of floor space, and which is adaptable to cooperation with other devices and processes in a plywood plant.

Other objects will appear as this specification progresses, more particularly such as relate to mechanical details.

My invention comprises the novel method of manufacturing such plywood, and the novel mechanism whereby such a method may be practiced, as illustrated in the accompanying drawings, and as will be hereinafter described and claimed in this specification, and the scope of my invention is to be limited only as required by the claims at the end of this specification.

In the accompanying drawings I have shown my invention largely in diagrammatic fashion, and in a form and arrangement such as is now preferred by me.

Figure 2 is an elevation of the cooperating parts of a press and an unloading car, and Figure 3 is a plan view of a portion of such mechanism.

Figures 4, 5, 6 and 7 are diagrammatic elevations of portions of the several parts of the mechanism, illustrating successive steps in the method.

Figure 1:
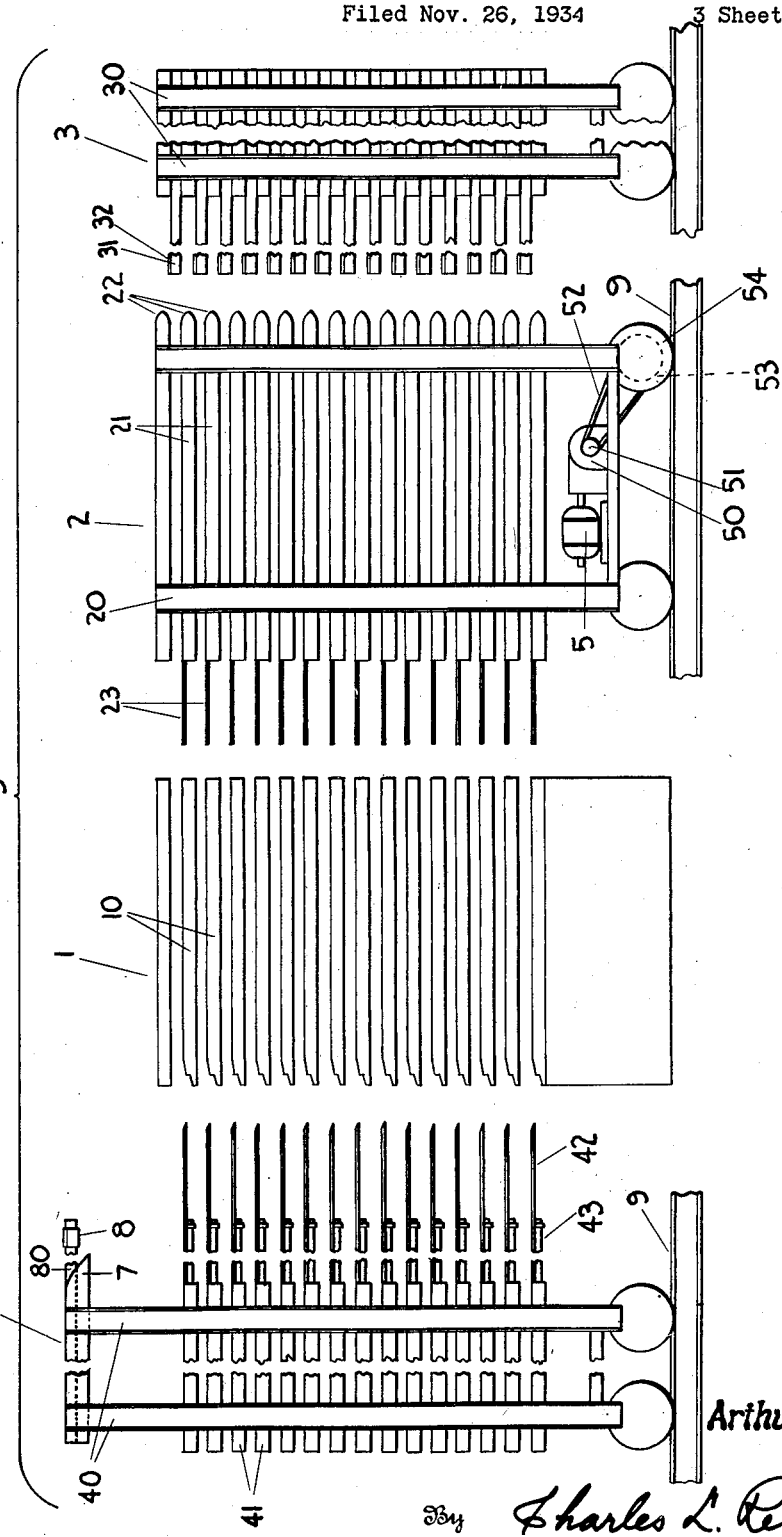
Figure 1 is a general elevation, largely diagrammatic, of the cooperating devices constituting my mechanism.

As an example of a receiver of some kind I have illustrated the press, generally designated by the numeral 1, composed of a plurality of heated press plates 10 which can be brought together or separated by any suitable operating and control means. These plates are movable apart to occupy a definite spaced relation when open, so that each plate stands at a definite level above the floor or above a track 9 whereon the cooperating members are movable. A press suitable for such an operation is shown in my companion application, Serial No. 754,826, filed the same date as this application, and reference may be made to that application to show the manner of heating the press plates and the manner of supporting, controlling and moving the same. It will be evident, however, that any suitable press of this general type or other receiver for supporting pieces in superposed spaced relation may be employed with my mechanism and in performing my handling method, the construction and control of the press in general constituting no part of the present invention.

At one side of such a press or other receiver a loading car, generally designated by the numeral 2, is movable towards and from the press, preferably along the rails 9, and beyond the loading car, with relation to the press, is similarly movable a poker car 3. On the opposite side of the press from the loading car 2 an unloading car 4 may advance towards and from the press. As is shown in Figure 1 with relation to the loading car 2, each car is provided with means to advance it towards the press and to effect its recession from the press, such means conveniently constituting a motor 5, a reduction gear within the casing 50 driving a pulley or sprocket wheel 51, which through a belt or chain 52 drives a pulley or sprocket wheel 53 upon a drive wheel 54 which supports the car. A similar arrangement is shown in Figure 2 for the unloading car 4, and a like arrangement (not shown) may be made for driving the poker car 3. The controls for such motors have not been illustrated, but would be any conventional or desired controls, and such controls may incorporate track or limit switches (not shown) as is common in controlling cars movable to definite limits.

When I refer to advance of the cars or to forward projection of parts, in the specification and claims, it is to be understood that I mean in a direction toward the press or receiver, and thus a part which projects forwardly from the loading car is projected in a direction oppositely to a part which projects forwardly from the unloading car, and these two cars advance in opposite directions, with relation to each other, advance in each case being towards the press.

The loading car consists generally of frames 20 which support a plurality of platforms or other supporting means 21 which are spaced and held at such elevation as to bring the spaces between them substantially into registry with the spaces between the press plates 10, when the latter are open. The supports 21 may be beveled or relieved, as indicated at 22, to facilitate edgewise insertion of previously laid up panels of plywood between them, and for a further purpose which will appear shortly. Such panels would ordinarily be laid up in advance with the core strips in position between the faces, and the adhesive or binder in place intermediate the core and faces, and a transfer car loaded with such laid-up plies would be conveyed to a point intermediate the loading car 2 and the poker car 3, whereby workmen may insert each such laid-up ply into the approximate space between the supports 21 of the loading car. For a reason which will appear hereafter the loading car is provided with a plurality of sticks 23 which project forwardly from each support 21 at a level such that they may project forwardly just above or in contact with the upper surface of each hot plate 10 of the press.

The poker car consists of a framework 30, in advance of which projects a plurality of poker devices, each one consisting of a member 31 and a member 32. These members lie close alongside one another, and are somewhat yieldingly held apart; that is to say, their upper and lower edges do not coincide, at least at their forward ends. They are located at such a level that they will enter between the beveled edges 22 of the loading car, and will completely fill the space between the supports 21, because of their yielding characteristics, and will thereby without fail engage the rear edge of each panel carried by each support 21, to push it through the loading car and into the press. The poker members 31 and 32 are of such length as to extend through the loading car and into the press, when the loading car has been advanced to loading position adjacent the press, and the poker car is close alongside the loading car.

The unloading car includes a framework 40 and guides 41 within which are held and guided supports 43, which telescope with respect to the unloading car itself, and the function of which is to support the flimsy panel carriers 42, incapable in themselves of supporting the weight of a panel, which are fixed to and project forwardly from the unloading car itself. These carrier supports 43 are guided by suitable means such as the rollers 44, and are withdrawn into the car at a certain point in the cycle of operation, as will appear hereafter.

The forward edges of the thin panel carriers 42 are brought down to an even thinner edge lying substantially in the plane of the carrier's lower face, as indicated at 45, to form panel lifters, whereby when the unloading car is advanced into the open press these edges will ride on the upper surface of each press plate 10, and will enter between this surface and any panel which is resting on the press plate, to separate it from the press plate, to lift it and to slide beneath the panel beyond its center of gravity. To this end the carriers 42 must project substantially through the press, yet they must be supported from the car 4 when the latter has receded away from the press and the outer ends of the carriers 42 are no longer supported by the press. It is for this reason that the supports 43 are telescoping. As the unloading car advances toward the press, the ends of these carrier supports 43 engage with shoulders 14 in the press to stop them, and as the car continues its advance the supports telescope into the car. At a proper time in this cycle, and before recession of the car 4 has commenced, dogs 11, one or more upon each press plate 10, are moved upwardly to engage within recesses 46 of the carrier support, thereby to lock these supports to the press plates, and to hold them in such locked position during the initial portion of the recessional movement of the unloading car, so that the supports 43 are drawn outward from the unloading car as it recedes, until they form an adequate support for the fixed carriers 42 and the panels carried thereby, at which time the dogs 11 are disengaged from the recesses 46, freeing the car 4 and permitting it to recede to a sufficient distance to permit unloading of the pressed panels therefrom. This disengagement occurs as part of one continuous operation, without any stoppage of the car 4.

Any suitable means may be provided for effecting this locking and unlocking action. As herein shown, all the dogs 11 are connected through the medium of individual arms 12 and a common link 60 to an arm 61 mounted upon the same shaft with an arm 6, carrying a pin 62. This may be located above the press. Carried by the unloading car 4 is a cam-like actuator 7 projecting forwardly at a level to engage and raise the pin 62, and therefore the arm 6 and the dogs 11. In consequence, after the unloading car 4 has advanced sufficiently to engage the actuator 7 with the pin 62, the dogs are raised and the supports 43, which theretofore have come into contact with the shoulders 14, are locked in position. To assist in holding the arm 6 raised, a slide 8 is carried on a fixed guide 80, projecting alongside the actuator 7, and this slide 8, which has previously been advanced to engage its end with the pin, advances as the pin is raised by the actuator 7 until it lies beneath the pin, whereupon the weight of the pin and associated parts holds the slide 8, and the guide 80 moves through the slide. This action may take place during the final part of the advance of the car 4, and a pin 82 will insure movement of the slide into position beneath the pin 62.

Upon recession of the unloading car, the slide 8, still remaining in position beneath the pin 62, holds all parts locked, and consequently serves to withdraw the carrier support 43 from the unloading car, until a pin or stop 81, carried on the end of the guide 80, engages the slide and withdraws it from beneath the pin 62, permitting the arm 6 to drop, and the dogs 11 thereupon release the supports 43, which by now have been withdrawn to the full line position of Figure 2, where they will readily support the panel carriers 42 and the panels carried thereby.

In describing the operation and the method, we may assume that the press is closed, pressing previously inserted panels. The loading car 2 has receded from the press, as has the poker car 3, and during the pressing operation the loading car is being loaded with previously laid-up panels to be pressed. The unloading car 4 has also receded from the press, and has been unloaded of the previously pressed panels.

The press, after a predetermined time interval, opens. The loading car 2 immediately advances to a predetermined position wherein the sticks 23 are advanced between the press plates to a point where they substantially contact with the edge of a panel P which is in the press. Parts now occupy the relative positions of Figure 4. The unloading car has been advancing, and at about this time the panel carriers 42 engage the opposite edge of the panels P within the press, and since these supports are somewhat overhanging, they tend to scrape the surface of each of its press plates, and they enter beneath the edge of the panel, eventually lifting it entirely from the press plate whereon it previously rested, and preventing any further heating by contact. Figure 5 illustrates this stage of the process.

Now the unloading car commences to recede. Having lifted the pressed panels P, it starts to remove them from the press. The poker car has previously advanced, its pokers 31 and 32 engaging the edge of panels P' previously placed in the loading car 2, and as the poker car continues to advance, the loading car standing still and the unloading car receding, the fresh panels P' are pushed by the pokers through the loading car and into the press, all simultaneously, as indicated in Figure 6, so that no one panel is subjected to the heat of the press for a longer time than any other panel. The fresh panels P' eventually come to rest each upon its hot plate, the loading car recedes to remove its sticks 23 from between the press plates, and the poker car recedes and leaves a space for a car load of new panels ready to be placed in the loading car. The position of parts during this recession is shown in Figure 7. The press, being clear, closes again, and subjects the fresh panels P' to heat and pressure for a predetermined time interval, whereupon it opens and the cycle is repeated.

It will be seen that the loading and unloading can thus be expeditiously accomplished, the fresh panels moving into the press as the freshly pressed panels leave it. The sticks 23 back up the fresh panels against any tendency which might be caused by the supports 42 to shove them back out of the press. A minimum of time is consumed in the operation, and it is automatically assured that no panel will be subjected to the heat for a longer time than any other panel. Also the application of heat by direct contact between the panels and the hot plates may be obtained while the panels are in the press, but immediately after the press opens, this surface contact is relieved to avoid too long an application of such direct heat.

As I have indicated at the outset of this specification, suitable automatic controls, whereby the cars may be advanced each a given distance and then stopped, may be provided. The panels must be substantially centered in the press, so that the pressure will be uniformly distributed, and the press must be of a size to take the largest panels which it is expected to make (for example 12 by 15 feet); consequently the sticks 23 will advance for one width of panels a given distance into the press, and for panels of another width a lesser or greater distance, and the pokers 31 and 32 will correspondingly advance more or less in accordance with the width of the panel to be pressed, so that each panel lies substantially midway between the edges of the press plates. Such automatic controls as will effect the operation of the cars in this manner may be provided in a manner which is common in that art, or the operation may be controlled by the workmen through manual controls for the several motors.

What I claim as my invention is:

1. Mechanism for handling panels comprising, in combination with a receiver having spaced means to receive superposed panels, a loading car, an unloading car, and a poker car, each movable towards and from the receiver, means carried by the unloading car to lift panels from the spaced means whereon they rest as the unloading car advances towards the receiver, means carried by the loading car to support a plurality of panels in superposed relation, means engageable with each receiver held panel, upon advance of the loading car towards the receiver, to prevent retrograde movement of the panels under the influence of the lifting means, and means carried by the poker car to engage and advance fresh panels from the loading car into the receiver.

2. The combination of claim 1, wherein the lifting means comprises members projecting fixedly from the unloading car and formed to separate the individual panels from and to lift them off the spaced means of the receiver whereon they rest, a support for each of said members telescopically engaged with the unloading car and engageable with the receiver, upon advance of the unloading car towards the receiver, to move into the unloading car, and means to withdraw said support, as the unloading car recedes, to support the lifting member and the panel carried thereby.

3. The combination of claim 1, wherein each panel engaging means carried by the poker car comprises two forwardly projecting relatively vertically movable members, yieldably separable at their advancing ends, and the loading car includes spaced guide means whereon each panel rests, engageable with the poker members as the latter advance through the loading car to move them together to insure edge contact of said members each with its respective panel.

4. The combination of claim 1, wherein each means to prevent retrograde movement is carried by the loading car and comprises a plurality of forwardly projecting sticks each at a level to engage a panel within the receiver, and the unloading car is disposed at the opposite side of the receiver, and the lifting means thereon comprises forwardly projecting members each at a level to slide along the upper surface of a panel receiving means, and formed to enter between such surface and the panel resting thereon.

5. The combination of claim 1, wherein each means to prevent retrograde movement is carried by the loading car and comprises a plurality of forwardly projecting sticks each at a level to engage a panel within the receiver, and the unloading car is disposed at the opposite side of the receiver, the lifting means thereon comprises forwardly projecting members each at a level to slide along the upper surface of a panel receiving means, and formed to enter between such surface and the panel resting thereon, and the panel engaging means carried by the poker car comprises a plurality of forwardly projecting members each at a level to enter between the panel supports of the loading car, and is of a length to extend past the loading car and into the receiver.

6. In mechanism for handling panels, the combination of a receiver having spaced means to receive superposed panels, a car movable towards and from the receiver, a plurality of members projecting fixedly in advance of said car each at a level to engage the upper surface of a panel receiving means and formed to enter between such surface and a panel resting thereon, a support for each of said members telescopically supported in the car and engageable with the receiver, upon advance of the car towards the receiver, to move into the car, means to automatically secure said supports to the receiver, whereby they will be withdrawn from the car as the latter recedes, and will thereby support each its fixedly projecting member, and means to automatically release said supports following a predetermined recession of the car.

7. The combination of claim 6, wherein the support securing and releasing means comprises a dog carried by each panel receiving means and engageable each with the corresponding support to lock the same to the receiver, a pivoted arm operatively connected to all the dogs, a locking actuator carried by the car and engageable with said arm as the car advances to swing it and the dogs into locked position, means to hold the arm in locked position, and means carried by the car to release the arm for movement into unlocked position, and operable by retrograde movement of the car.

8. The combination of claim 6, wherein the support securing and releasing means comprise a dog carried by each panel receiving means and engageable each with the corresponding support to lock the same to the receiver, a pivoted arm operatively connected to all the dogs, a locking actuator carried by the car and engageable with said arm as the car advances to swing it and the dogs into locked position, a slide guided upon the car for relative movement in the direction of the car, and positioned to engage with the arm to retain the latter in locked position, and a slide-engaging member movable with the car to move the slide from engagement with the arm upon retrograde movement of the car.

9. Mechanism for use with a multiple hot plate press in the simultaneous manufacture of a plurality of panels, each incorporating a binder requiring the application of heat and pressure through a specified time interval, including means insertable upon the opening of the press, following completion of the pressing operation, between the several panels and the respective heated press surfaces whereon they rest, to lift all panels simultaneously therefrom, means engageable with the panels to prevent their retrograde movement under the influence of said first means, and means to advance the panels, thus lifted, to a point beyond the press.

10. Loading mechanism for a receiver having spaced means to support panels superposed in spaced relation, comprising a loader having a plurality of spaced, horizontal disposed plates for carrying panels in superposed position, a poker support movable towards and from the receiver, and superposed poker members carried by said poker support and insertable respectively between the spaced plates of said loader, for engaging simultaneously all the panels supported by the loader to push them simultaneously from the loader into the receiver.

11. The method of handling panels which includes the steps of disposing a plurality of panels in spaced, superposed relation, sliding all the panels simultaneously edgewise onto spaced plates, to dispose each panel in a position resting flat on a separate plate of extent in all directions greater than the panel, simultaneously lifting all the panels, each from contiguous engagement with its plate, and simultaneously removing the lifted panels edgewise from between the plates.

12. The method of handling panels, which includes the steps of simultaneously advancing a plurality of panels edgewise between spaced plates, disposing each panel in a position resting flat on a separate plate in contiguous contact therewith, simultaneously lifting all the panels from the plates, each panel clear of the plate whereon it rests, and finally simultaneously removing the lifted panels from between the spaced plates, simultaneously therewith advancing fresh panels between the plates.

13. The method of handling panels which comprises supporting a plurality of panels in spaced, superposed relation, advancing the superposed panels to a position adjacent to spaced plates, lifting simultaneously free from the several plates the panels resting thereon, while restraining the same from edgewise movement, simultaneously withdrawing edgewise the lifted panels, and simultaneously poking the fresh panels to slide them simultaneously between the spaced plates, each to rest flat on its respective plate.

14. The method of handling panels incorporating a binder requiring application of heat and pressure during a given time interval, which includes the steps of simultaneously advancing a plurality of panels, arranged in superposed position, edgewise into spaced apart heated pressing positions, lifting all the pressed panels simultaneously, each from its heated pressing position, and moving all the lifted panels simultaneously from the heated pressing positions.

15. The method of handling in a press panels incorporating a binder requiring application of heat and pressure during a given time interval, which includes the steps of disposing a plurality of uncured panels individually in spaced, superposed relation, simultaneously advancing said panels edgewise into spaced heated pressing positions, each to rest in its pressing position directly on a pressing surface beneath it, lifting all the pressed panels simultaneously, each from the pressing surface whereon it rests, and simultaneously removing the lifting panels edgewise from the spaced pressing positions.

16. The method of handling panels, which includes the steps of simultaneously advancing a plurality of uncured panels, each incorporating a binder requiring application of heat and pressure during a given time interval, edgewise into spaced apart, heated, pressing positions, each to rest in its pressing position upon a pressing surface beneath it, advancing unheated supports simultaneously beneath all the pressed panels to lift each from its pressing surface, and finally simultaneously removing the lifted panels from the spaced pressing positions, simultaneously therewith advancing fresh panels into the pressing positions.

17. The method of handling panels incorporating a binder requiring application of heat and pressure during a given time interval, in a multiple hot plate press and by the aid of a loading car, an unloading car, and a poker car, all movable towards and from the press, which method comprises supporting a plurality of uncured panels in spaced, superposed relation, advancing the superposed panels to a position adjacent to their respective pressing positions, and into contact with previously pressed panels supported in such pressing positions, lifting simultaneously from the several pressing positions the previously pressed panels, while restraining the same from edgewise movement, simultaneously withdrawing edgewise the lifted panels, and simultaneously poking the fresh panels to slide them simultaneously into their respective pressing positions to be pressed.

18. The method of handling panels incorporating a binder requiring curing by application of heat and pressure through a specified time period, which comprises the steps of disposing a plurality of such uncured panels in spaced, superposed loading position, advancing said panels in one movement simultaneously edgewise from such loading position into pressing position between heated pressing surfaces, and in one movement simultaneously removing all the pressed panels each from contact with a heated surface.

19. Mechanism for moving a panel from a position between two parallel surfaces and lying flat upon the lower surface into a receiver, comprising two forwardly projecting relatively vertically movable members, yieldably separable at their advancing ends to an aggregate width in excess of the spacing of such surfaces, means to advance said members between the surfaces and into engagement with the panel disposed therebetween, and guide means at the entrance to the space between such surfaces engageable with said vertically movable members to compress them sufficiently to enter between such surfaces and to move in contact with such surfaces.

20. Mechanism for removing a panel lying flat upon a planar surface which contiguously engages the entire under side of the panel, comprising a thin panel carrier of a length in excess of one-half the extent of the panel in the direction of the carrier's length, means to insert said panel carrier lengthwise between a panel and the surface whereon it rests, to lift the panel from such surface, and to dispose the leading edge of the panel carrier beyond the center of gravity of the panel, and means to retract said panel carrier with the panel carried thereby to withdraw the panel edgewise from the surface.

21. The combination of claim 20, and means engageable with the edge of the panel remote from the panel carrier to prevent retrograde movement of the panel under the influence of the panel carrier as it is inserted between the panel and the surface whereon it rests.

22. Unloading mechanism for a receiver having spaced means to support panels superposed in spaced relation, comprising an unloader, a plurality of flimsy members carried by the unloader, spaced correspondingly to the spacing of the panels in the receiver, for insertion into panel-supporting position between the panels and the receiver by relative movement, said members being inherently incapable of supporting the panels, and means cooperating with said members to stiffen them, for the support of the panels, as said members and the panels thereon are withdrawn from the receiver.

23. Mechanism for removing a panel lying flat upon a surface, comprising a flimsy panel carrier, means to insert said panel carrier between a panel and the surface whereon it rests, to lift the panel from contact with such surface, means to withdraw the panel carrier from the surface with the panel thereon, and means movable relative to the panel carrier to stiffen such carrier progressively, upon its withdrawal from the surface, sufficiently to support the weight of the panel on the carrier.

24. Unloading mechanism for removing a panel lying flat upon a surface, comprising a support movable toward and away from the surface, a panel carrier supported by one edge in cantilever fashion by said support, its opposite edge being insertable between the panel and the surface whereon it rests, and a stiffening member supported by and progressively projectable from said support, immediately beneath and in supporting engagement with said panel carrier as the support is moved away from and the panel carrier is withdrawn from the surface.

25. Unloading mechanism for removing a panel lying flat upon a plate, comprising a support movable toward and away from the plate, a panel carrier fixedly supported by one edge in cantilever fashion by said support, its opposite edge being insertable between the panel and the plate, a stiffening member immediately underlying and in supporting engagement with said panel carrier and positioned to abut the plate as the support is moved toward such plate, means guiding said stiffening element for progressive retraction within said support upon abutment of the stiffening member with the plate and continued movement of the support toward the plate, locking means engageable between the plate-abutting end of said stiffening member and the plate to restrain separating movement of said stiffening member and the plate as said support and panel carrier start to recede from the plate, said stiffening member guiding means also guiding the member for progressive projection from the support to stiffen the panel carrier as it is withdrawn from the plate, and means operable to disengage said locking means for separation of said stiffening member and the plate upon a predetermined recession of said support from the plate.

26. Mechanism for handling laid up multi-ply panels, comprising, in combination with a receiver having spaced means to receive superposed panels, a loading car positioned adjacent the receiver, and having a plurality of supports vertically spaced by distances in excess of the thickness of the panels, a poker car disposed on the opposite side of the loading car from the receiver, and including a plurality of projecting pokers spaced apart vertically to correspond to the spacing of the panels when carried upon said supports, and means guiding the poker car for movement towards the receiver, the pokers each engaging the rear edge only of the corresponding panel, during such movement, and advancing it edgewise from its support, on the loading car, into the receiver.

ARTHUR R. WELCH.